United States Patent
Osorio (10) Patent No.: US 10,889,165 B2
(45) Date of Patent: Jan. 12, 2021

(54) VEHICLE DOOR ASSEMBLY

(71) Applicant: Honda Motor Co., Ltd., Tokyo (JP)

(72) Inventor: Sebastian Osorio, Columbus, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 61 days.

(21) Appl. No.: 16/234,464

(22) Filed: Dec. 27, 2018

(65) Prior Publication Data

US 2020/0207192 A1 Jul. 2, 2020

(51) Int. Cl.
| B60J 5/00 | (2006.01) |
| B60J 5/04 | (2006.01) |
| B62D 25/04 | (2006.01) |
| E05D 7/00 | (2006.01) |

(52) U.S. Cl.
CPC ............. *B60J 5/0487* (2013.01); *B60J 5/047* (2013.01); *B60J 5/048* (2013.01); *B62D 25/04* (2013.01); *E05D 7/00* (2013.01); *E05Y 2900/531* (2013.01)

(58) Field of Classification Search
CPC .......... B60J 5/0487; B60J 5/047; B60J 5/048; B62D 25/04; E05D 25/04; E05D 7/00; E05Y 2900/531
See application file for complete search history.

(56) References Cited

U.S. PATENT DOCUMENTS

| 1,869,274 | A | 7/1932 | Phillips |
| 7,073,294 | B2 | 7/2006 | Yamaoka et al. |
| 7,819,465 | B2 | 10/2010 | Elliott et al. |
| 9,016,760 | B2 | 4/2015 | Kuroda et al. |
| 9,061,601 | B2 * | 6/2015 | Uchiyama ................ B60N 2/36 |
| 9,555,701 | B2 | 1/2017 | Borowicz et al. |
| 9,765,553 | B2 | 9/2017 | Suzuki |
| 10,427,578 | B2 * | 10/2019 | Deckard ................ B60J 5/0412 |
| 2009/0218851 | A1 | 9/2009 | Anderson et al. |
| 2012/0160592 | A1 * | 6/2012 | Tsumiyama ......... B62D 21/183 180/312 |
| 2013/0199097 | A1 * | 8/2013 | Spindler ................ B60R 21/06 49/394 |
| 2016/0185192 | A1 * | 6/2016 | Yamamoto ............ B60J 5/0487 296/146.9 |
| 2019/0009655 | A1 * | 1/2019 | Getzschman .............. B60J 1/10 |
| 2020/0079192 | A1 * | 3/2020 | Getzschman .......... B60J 5/0412 |

FOREIGN PATENT DOCUMENTS

| KR | 100377062 B1 | 3/2003 |
| KR | 100428162 B1 | 4/2004 |

* cited by examiner

*Primary Examiner* — Lori L Lyjak
(74) *Attorney, Agent, or Firm* — Kenealy Vaidya LLP

(57) ABSTRACT

A door assembly for a vehicle can include a front door assembly and a rear door assembly. A rear portion of the front door assembly can terminate at a rear edge. At least a portion of the rear edge can be spaced away from a side frame member in the longitudinal direction toward the first side frame member. A front portion of the rear door assembly can terminate at a front edge. The front edge can be adjacent to the rear edge of the front door. At least a portion of the front edge can be spaced away from the side frame member in the longitudinal direction toward the first side frame member such that at least a portion of the front edge of the rear door assembly is located between the rear edge of the front door assembly and the second side frame member.

20 Claims, 6 Drawing Sheets

VEHICLE DOOR ASSEMBLY

BACKGROUND

The disclosed subject matter relates to a vehicle door assembly, and methods of use and manufacture thereof. More particularly, the disclosed subject matter relates to methods and apparatus for attaching doors of a vehicle.

A vehicle can include one or more door assemblies that can permit ingress/egress to/from a vehicle interior or vehicle storage area. A door or door assembly can be rotatably attached to a frame or other supporting structure of a vehicle. For example, a door assembly can be pivotally attached by a hinge so as to allow the door assembly to be opened and closed. Some doors are pivotally attached or hinged at a forward portion of the door. Some doors are pivotally attached or hinged at a rear portion of the door.

However, known arrangements of door assemblies have deficiencies.

SUMMARY OF THE INVENTION

Some embodiments are directed to a door assembly for selectively opening and closing first and second openings in a vehicle frame assembly. The first opening can extend between a first side frame member and a second side frame member. The second opening can extend between the second side frame member and a third side frame member. The door assembly can include a front door assembly and a rear door assembly. The front door assembly can extend along the first opening and between the first and second side frame members. The front door assembly can be movably connected to the vehicle frame between an opened position and a closed position to selectively open and close the first opening. The front door assembly can include a front portion and a rear portion. The rear portion can terminate in a longitudinal direction of the frame assembly at a rear edge. At least a portion of the rear edge can be spaced away from the second side frame member in the longitudinal direction toward the first side frame member. The rear door assembly can extend along the second opening and between the second side and third side frame members. The rear door assembly can be movably connected to the vehicle frame between an opened position and a closed position to selectively open and close the second opening. The rear door assembly can include a front portion and a rear portion. The front portion can terminate in a longitudinal direction of the frame assembly at a front edge. The front edge can be adjacent to the rear edge of the front door. At least a portion of the front edge can be spaced away from the second side frame member in the longitudinal direction toward the first side frame member such that at least a portion of the front edge of the rear door assembly is located between the rear edge of the front door assembly and the second side frame member.

Some embodiments are directed to an all-terrain vehicle that can include a frame assembly, a plurality of wheels, a front door assembly, and a rear door assembly. The frame assembly can include first and second longitudinal frame members extending in a longitudinal direction of the vehicle and spaced apart in a transverse direction of the vehicle, a first side frame member extending from the first longitudinal member in a vertical direction of the vehicle, a second side frame member extending from the first longitudinal member in the vertical direction of the vehicle, and a third side frame member extending from the first longitudinal member in the vertical direction of the vehicle. The second side frame member can be located between the first side frame member and the third side frame member in the longitudinal direction of the vehicle. The front door assembly can extend along the first opening and between the first and second side frame members. The front door assembly can be movably connected to the vehicle frame between an opened position and a closed position to selectively open and close the first opening. The front door assembly can include a front portion and a rear portion. The rear portion can terminate in a longitudinal direction of the frame assembly at a rear edge. At least a portion of the rear edge can be spaced away from the second side frame member in the longitudinal direction toward the first side frame member. The rear door assembly can extend along the second opening and between the second side and third side frame members. The rear door assembly can be movably connected to the vehicle frame between an opened position and a closed position to selectively open and close the second opening. The rear door assembly can include a front portion and a rear portion. The front portion can terminate in a longitudinal direction of the frame assembly at a front edge. The front edge can be adjacent to the rear edge of the front door. At least a portion of the front edge is spaced away from the second side frame member in the longitudinal direction toward the first side frame member such that at least a portion of the front edge of the rear door assembly is located between the rear edge of the front door assembly and the second side frame member.

Some embodiments are directed to a structural system for a vehicle that can include a frame assembly and a rear door assembly. The frame assembly can include a first side member provided on a side of the vehicle, a second side member provided on the side of the vehicle, and third side member provided on the side of the vehicle. The first side member can extend vertically on the side of the vehicle. The second side member can extend vertically on the side of the vehicle. The second side member can be disposed behind the first side member and in front of a third side member, and the second side member. Any point on a front contour of the second side member can constitute a second side member front edge point. The third side member can extend vertically on the side of the vehicle, and can be disposed behind the first side member. The rear door assembly can be provided on the side of the vehicle. The rear door assembly can have a front edge and a rear portion. The rear door assembly being movably attached to the vehicle frame so as to be movable between first position and a second position. Any point on the front edge of the rear door assembly can constitute a rear door front edge point, and each rear door front edge point: (a) can possess a vertical position in the vertical direction, (b) can be associated with a corresponding second side member front edge point based on having the same vertical position as such corresponding second side member front edge point, and (c) can be positioned forward, in the longitudinal direction, of such corresponding second side member front edge point.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

In an effort to reduce vehicle weight, simplify assembly and structure of the vehicle, and improve fuel economy and dynamic performance, a rear door assembly can be provided to extend forwardly beyond what can be referred to as the B-pillar so as to cover a portion of the B-pillar that might otherwise be covered by structure other than the rear door. In particular, an advantage of the arrangement of the disclosure is that the arrangement simplifies structure of the vehicle around the B-pillar. Further details are described below.

The vehicle 10 shown in FIGS. 1-6 is specialized for use on an unimproved path or on an unmarked path, and can be referred to as a multipurpose utility vehicle (MUV) or as a side-by-side all-terrain vehicle (SxS, or SxS ATV). However, the disclosed vehicle frame assembly with door assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 1:
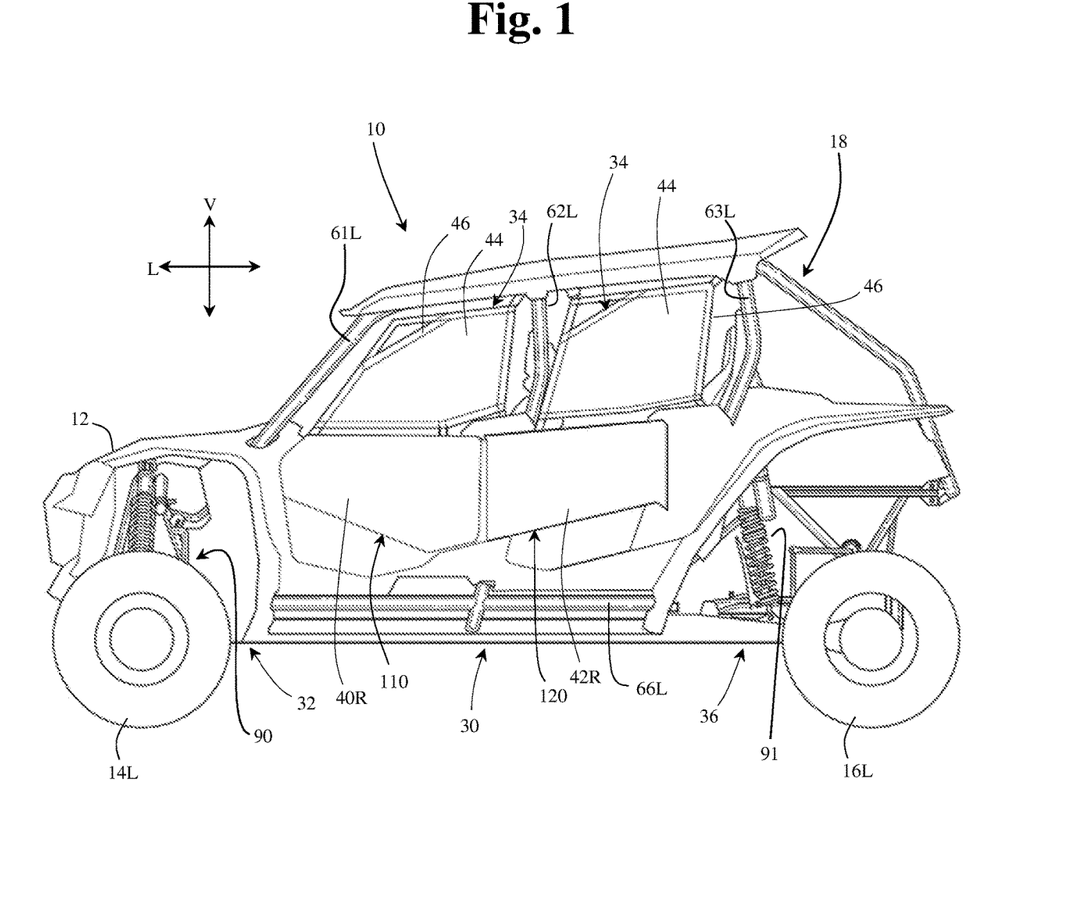
FIG. 1 is a left side view of an exterior of a vehicle in accordance with the disclosed subject matter.
Figure 4:
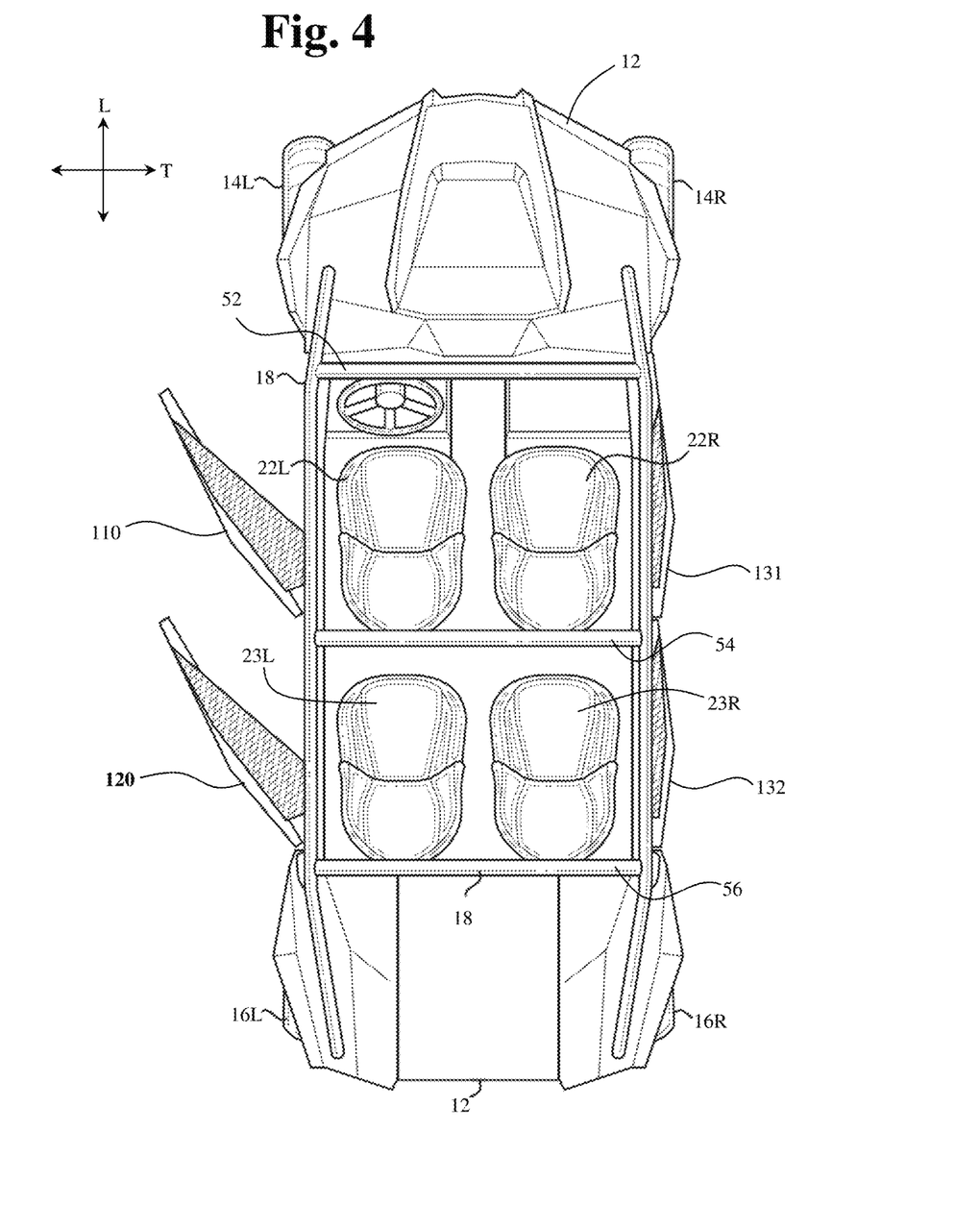
FIG. 4 is a top view of a vehicle shown in FIG. 1 in accordance with the disclosed subject matter.

Referring to FIGS. 1 and 4, the vehicle 10 can include a body 12, a pair of front wheels, 14L, 14R, a pair of rear wheels 16L, 16R, a frame assembly 18, a pair of front door assemblies 110, 131, a pair of rear door assemblies 120, 132, and a powertrain. Portions of the frame assembly 18 are hidden from view in FIG. 1 by the body 12 (but are shown in FIGS. 2-4, for example), and the powertrain is omitted for simplicity and clarity of the drawings.

The vehicle 10 can include a pair of front seats 22L, 22R and a pair of rear seats 23L, 23R mounted in a passenger area of the vehicle 10. The frame assembly 18 can include a roll cage 28 configured to extend around and above the seats 22L, 22R, 23L, 23R and the passenger area. The roll cage 28 can cooperate with the body 12 and/or at least a portion of the frame assembly 18 to define door openings through which a passenger may pass in order to enter or exit the passenger area.

Figure 2:
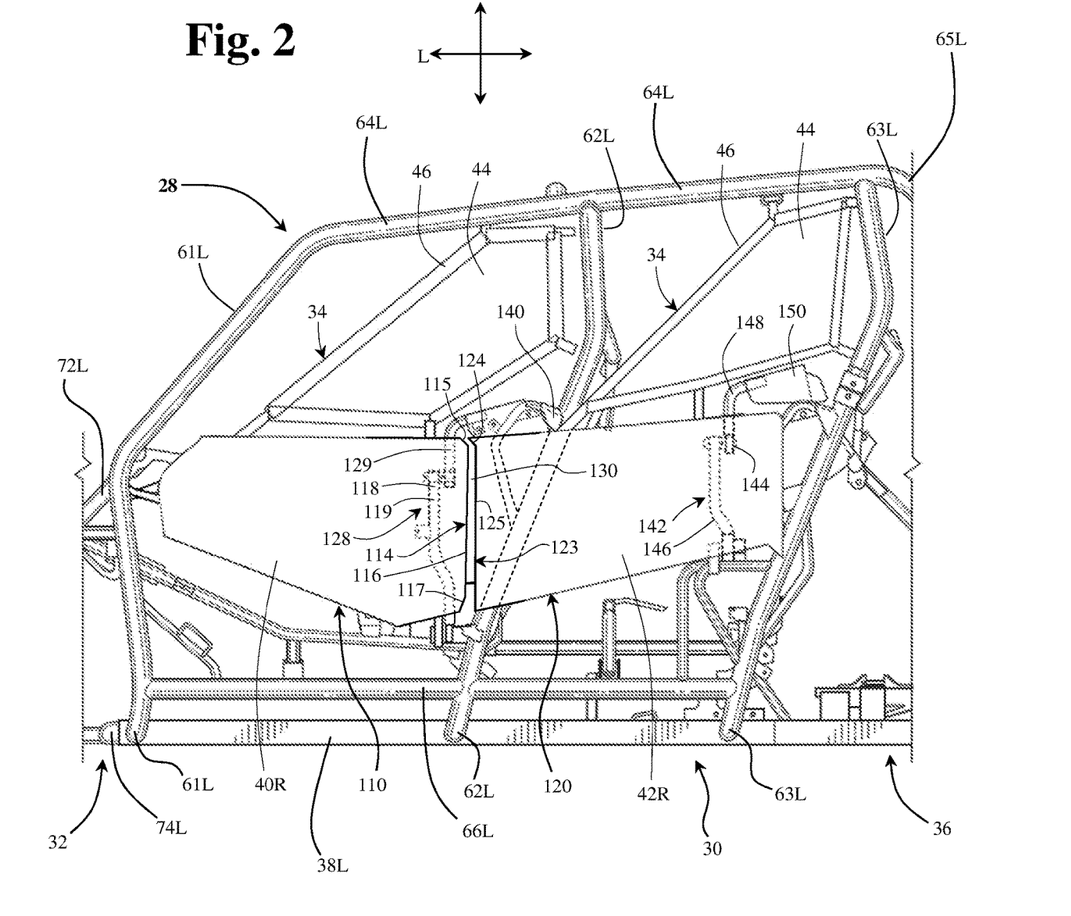
FIG. 2 is a left partial side view showing details of door assemblies of a vehicle shown in FIG. 1 in accordance with the disclosed subject matter.
Figure 3:
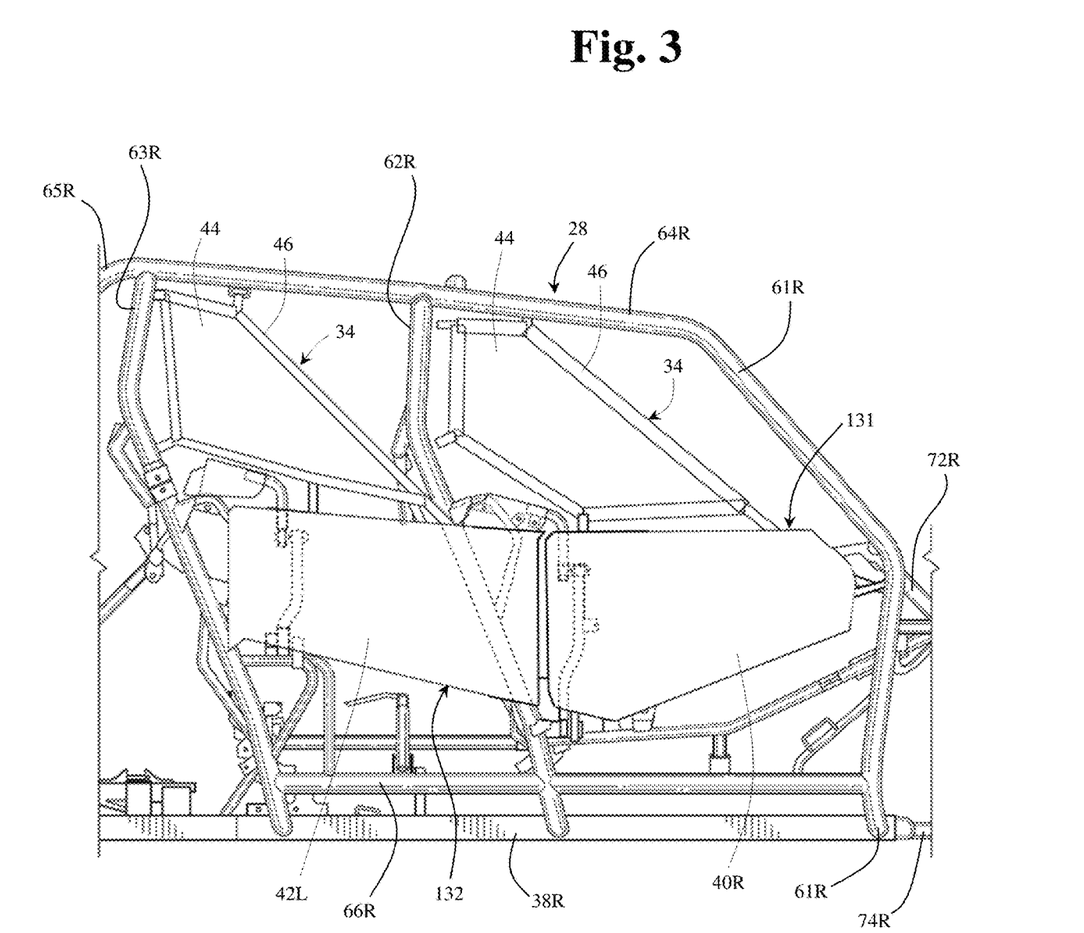
FIG. 3 is a right partial side view of a vehicle shown in FIG. 2 in accordance with the disclosed subject matter.

The door assemblies 110, 120, 131, 132, which occupy the door openings, each can include a panel door assembly, and can be configured to selectively open and close access through the door openings by moving between a closed position and a partially opened or fully opened position. In the closed position, the door assemblies 110, 120, 131, 132, can span the respective door openings to obstruct access to or from the passenger area via the door openings. In the closed position or disposition, the front portion of each door assembly 110, 120, 131, 132 can be latched to the roll cage 28. The partially opened position (or disposition) or the fully opened position (or disposition) can be any position where the door assemblies 110, 120, 131, 132 are pivoted away from the respective door openings to provide substantially unobstructed access to the passenger area via the door openings. FIGS. 1-3 show the door assemblies 110, 120, 131, 132 in the closed position, whereas FIG. 4 shows the left-side door assemblies 110, 120 in the open position and the right-side door assemblies 131, 132 in the closed position. Each of the door assemblies 110, 120, 131, 132 can be constructed as desired. For example, the door assemblies can be constructed of one or more panels of a respective panel assembly 40L, 40R, 42L, 42R. Each of the panel assemblies can have an uninterrupted exterior surface 40L, 40R, 42L, 42R. Alternatively, the door panel assemblies 40L, 40R, 42L, 42R can be constructed in various other manners as may be desired. For example, one or more of the door panel assemblies 40L, 40R, 42L, 42R can have an outer surface that is interrupted by one or more holes, ridges and/or other contour or character features. Each of the door assemblies 110, 120, 131, 132 can include a net assembly 34 that includes a mesh netting 44 and a frame 46 that surrounds the mesh netting 44. The frame 46 can be connected to each of the frame assembly 18 and the upper edge of the respective one of the door panel assemblies 40L, 40R, 42L, 42.

The vehicle 10 can include a powertrain. The powertrain can include an internal combustion engine, one or more electric motor(s) or a hybrid of an internal combustion engine and one or more electric motor(s), or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. The vehicle 10 can include frame assembly 18 as shown. In particular, FIGS. 2-4 are provided with upper panels, including a roof panel, removed for simplicity and clarity of the drawing. The frame assembly 18 can be configured to support the body 12, door assemblies 110, 120, 131, 132, seats 22L, 22R, 23L, 23R, suspension components for the wheels 14L, 14R, 16L, 16R, powertrain, steering system, control pedal assemblies, passengers and cargo items, for example. The frame assembly 18 can be configured to withstand various modes of operation, including operation on unimproved paths, and can be configured to surround the passenger area.

The frame assembly 18 can include a main frame assembly 30, a front frame assembly 32 and a rear frame assembly 36.

The main frame assembly 30 can define the passenger area of the vehicle 10. The main frame assembly 30 can also provide an overall bending stiffness and torsional stiffness characteristic for the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/ systems, such as but not limited to portions of the body 12, a front final drive assembly, steering system components, engine cooling system, headlights, etc.

A front bumper assembly can be connected to the front end of the front frame assembly 32, such that the front frame assembly 32 can be located between the front bumper assembly and the main frame assembly 30. A front bumper assembly can extend beyond the exterior of the body 12, or alternatively, one or more portions of the body 12 can conceal a front bumper assembly.

The rear frame assembly 36 can be connected to the rear end of the main frame assembly 30 such that the passenger compartment is located between the front frame assembly 32 and the rear frame assembly 36. The rear frame assembly 36 can be configured with mounting points for the rear suspension components and any appropriate components/systems, such as but not limited to portions of the body 12, a rear final drive assembly, taillights, etc.

The main frame assembly 30, front frame assembly 32 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

Referring to FIG. 2, the front frame assembly 32 can be connected to a lower cross member and each of first cage side members 61 (61L, 61R) of the main frame assembly 30. The various "cage side member" can also be characterized as "side members". The front frame assembly 32 can include a pair of front lower members 74L, 74R. The front frame assembly 32 can be configured to support a front suspension and wheel assembly 90 (FIG. 1), and other components such as but not limited to a radiator, a steering rack assembly and a front final drive assembly. Referring to FIG. 1, the front suspension and wheel assembly 90 can include a front suspension member on each side of the front frame assembly 32, a damper and spring assembly on each side of the front frame assembly 32.

In the exemplary embodiment of FIGS. 2 and 3, each of the front lower frame members 74L, 74R (as well as other associated frame members not shown) can be configured as hollow metal tubes having a substantially circular cross-section. However, any combination of the front frame members can have a cross-sectional shape that is different from a substantially circular cross-sectional shape. Further, any combination of the front frame members 74L, 74R and other associated frame members can be formed of a material other than metal, such as but not limited to carbon fiber, plastic, carbon fiber reinforced plastic, ceramic, pulp, or glass fiber reinforced plastic.

Further, the front lower frame members 74L, 74R and other associated frame members can be welded to each other to form the structure described above. Embodiments are intended to include or otherwise cover any combination of the front lower frame members 74L, 74R and other associated frame members connected by threaded fasteners, adhesives, a combination of brackets and threaded fasteners, rivets, or other known connective structures, materials, or methods.

Referring to FIG. 2, the rear frame assembly 36 can be configured to support a rear suspension and wheel assembly 91, and other components such as but not limited to a power source, a transmission and a rear final drive assembly. The rear suspension and wheel assembly 91 can include, for example, at least one rear suspension member on each side of the rear frame assembly 36, a rear damper and spring assembly on each side of the rear frame assembly 36, a rear hub assembly on each side of the rear frame assembly 36, and the rear wheels 16L, 16R.

The rear frame assembly 36 can be connected to and can extend away from the main frame assembly 30 in the longitudinal direction L of the vehicle 10.

The rear frame assembly 36 in conjunction with other support components can be configured to support a powertrain assembly. For example, an exemplary powertrain can include a power source such as but not limited to an internal combustion engine (having a single cylinder or a plurality of cylinders), an electric motor, or a hybrid system that includes an internal combustion engine and an electric motor. The powertrain also can include a transmission connected to the power source and a final drive structure. The transmission can include various types of transmissions including a stepped speed ratio assembly or a continuously variable speed ratio assembly. The transmission can be configured as an automatic transmission, a manual transmission, or a semi-automatic transmission. A power source and the transmission can be connected to the rear frame assembly 36 in any appropriate manner such as but not limited to brackets and mechanical fasteners, welds, rivets, rubber mounting assembly(ies), fluid filled mounting assembly(ies), or any combination thereof.

Referring to FIGS. 2 and 4, in particular, the main frame assembly 30 can define the passenger area and can include the roll cage 28, a pair of longitudinal members 38L, 38R, a plurality of lower cross members (not shown), and a pair of support members 72L, 72R. The frame members can be connected together to form a fixed frame assembly or modular frame assembly in which selective removal and attachment is not or is intended. That is, the frame members can be intended to remain fixed to each other unless a destructive process such as but not limited to sawing, cutting, crushing, ripping, melting, etc., is applied to the fixed frame assembly. In contrast, some frame members can be intended to be selectively removable and attachable to a remainder of the main frame assembly 30, for example, without requiring a destructive process such as but not limited to sawing, cutting, crushing, ripping, melting, etc. The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The roll cage 28 generally defines the passenger compartment. The roll cage 28 can extend in the longitudinal direction L of the vehicle 10, from the front end of the passenger area to the rear end of the passenger area. The roll cage 28 can define the limits of the passenger area in the transverse direction T of the vehicle 10, the longitudinal direction L of the vehicle 10 and in the vertical direction V of the vehicle 10. The roll cage 28 can be configured to support the door assemblies 110, 120, 131, 132 and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The roll cage 28 can be configured to resist, impede, or minimize deformation that could be caused by a load or kinetic energy input into the roll cage 28.

The roll cage 28 can be configured with any shape and contour that can be advantageous to meet the structural performance and aesthetic appeal desired for the vehicle 10. The roll cage 28 can be formed from any appropriate number of structural elements, from one to any number greater than one. For example, the roll cage 28 can include a plurality of cage cross members 52, 54, and 56 (as shown in FIG. 4), and a plurality of cage side members 61L, 61R, 62L, 62R, 63L, 63R, 64L, 64R, 65L, 65R, 66L, and 66R. Each of the cage members can be configured as a hollow tube having a substantially circular or oval cross-section shape. The cage members can be configured with any appropriate elongated shape that can provide the desired dimensionality of the passenger area and advantageously conform to the aesthetic appearance desired for the vehicle 10. For example, the cage members can be made from one or more lengths of a metal tube. Any one of the tubular cage members can be bent in one or more locations into a predetermined shape.

Each of the first cage side members 61L, 61R can be referred to as an A-pillar. Each of the first cage side members 61L, 61R can be connected at one end to a respective one of the longitudinal members 38L, 38R adjacent the front end of the respective one of the longitudinal members 38L, 38R. Each of the first cage side members 61L, 61R can extend along each of the vertical direction V, the transverse direction T and the longitudinal direction L of the vehicle 10.

As shown in FIG. 2 and FIG. 3, the roll cage 28 may also include fourth cage side members 64L, 64R. Each of the fourth cage side members 64L, 64R can be referred to as a roof rail or a top rail. Each of the fourth cage side members 64L, 64R can extend from and connect to a respective one of the first cage side members 61L, 61R. Each of the fourth cage side members 64L, 64R can connect to a respective one of second cage side members 62L, 62R. Each of the fourth cage side members 64L, 64R can extend along at least the longitudinal direction L of the vehicle 10.

The first cage cross member 52 can be connected to either the first cage side members 61L, 61R or the fourth cage side members 64L, 64R at a location that is adjacent to or at the junction of the first cage side members 61L, 61R and the fourth cage side members 64L, 64R. Alternatively, the first cage cross member 52 can be connected at the junction of the first cage side members 61L, 61R and the fourth cage side members 64L, 64R.

Each of second cage side members 62L, 62R can be referred to as a B-pillar. Each of the second cage side members 62L, 62R can be connected at a first end to a respective one of the longitudinal members 38L, 38R along the side of the respective one of the longitudinal members 38L, 38R. Each of the second cage side members 62L, 62R can be connected to an outer side of the respective one of the longitudinal members 38L, 38R.

Each of the second cage side members 62L, 62R can be connected at a second end to a respective one of the fourth cage side members 64L, 64R. The second cage cross member 54 can be connected to either the fourth cage side members 64L, 64R, or the second cage side members 62L, 62R, or a location that is adjacent to or at the junction of the fourth cage side members 64L, 64R and the second cage side members 62L, 62R.

Each of third cage side members 63L, 63R can be referred to as a C-pillar. Each of the third cage side members 63L, 63R can be connected at a first end to a respective one of the longitudinal members 38L, 38R along the side or at the rear end of the respective one of the longitudinal members 38L, 38R. Each of the third cage side members 63L, 63R can be connected to an outer side of the respective one of the longitudinal members 38L, 38R.

Each of the third cage side members 63L, 63R can be connected at a second end to either a respective one of the fourth cage side members 64L, 64R or a respective one of fifth cage side members 65L, 65R at a location that is adjacent to or at a junction of the respective one of the fourth cage side members 64L, 64R and the respective one of the fifth cage side members 65L, 65R. Alternatively, each of the third cage side members 63L, 63R can be connected at the second end to the junction of the respective one of the fourth cage side members 64L, 64R and the respective one of the fifth cage side members 65L, 65R.

The third cage cross member 56 can be connected to either the fourth cage side members 64L, 64R, or the third cage side members 63L, 63R, or the fifth cage side members 65L, 65R, or alternatively, at a location that is adjacent to or at the junction of the fourth cage side members 64L, 64R, or the third cage side members 63L, 63R, or the fifth cage side members 65L, 65R.

Each of the fifth cage side members 65L, 65R can be connected to and extend away from a respective one of the fourth cage side members 64L, 64R along the longitudinal direction L of the vehicle 10.

The cage cross members 52, 54, 56, can extend in the transverse direction T of the vehicle 10 from the left side of the roll cage 28 to the right side of the roll cage 28. The cage cross members 52, 54, 56, can be connected to each of respective pair(s) of the cage side members at respective locations spaced apart along the longitudinal direction L of the vehicle 10. The cage cross members 52, 54, 56, can be configured to maintain a predetermined spacing between the left cage side members 61L, 62L, 63L, 64L, 65L and the right cage side members 61R, 62R, 63R, 64R, 65R in the transverse direction T. The cage cross members 52, 54, 56, can define limits of the passenger area in the longitudinal direction L of the vehicle 10 and the vertical direction V of the vehicle 10. The cage cross members 52, 54, 56, can be configured to manage load and/or energy inputs so that deflection of the frame assembly 18 in the vicinity of the passenger area can be controlled in an advantageous predetermined manner. In the exemplary embodiment of FIG. 4, the cage cross members 52, 54, 56, can be connected to a respective left-side and right-side pair of the cage side members 61L, 61R, 64L, 64R, 62L, 62R, 65L, 65R by welding.

In accordance with the disclosed subject matter, the rear door assemblies 120, 132 can be provided to extend forwardly passed the B-pillar or second cage side member 62L, as described herein, such that structure in addition to the front and rear door assemblies is not used to fill a gap between the front door assembly and the respective rear door assembly. An advantage of the arrangement, of the disclosure, is to reduce the number of parts used to cover the side frame members 61L, 61R, 62L, 62R, 63L, 63R, as well as to simplify construction of the door assemblies. In particular, an advantage of the arrangement of the disclosure is that the described arrangement simplifies structure of the vehicle around the B-pillar (i.e., the second cage side members 62L, 62R).

Figure 5:
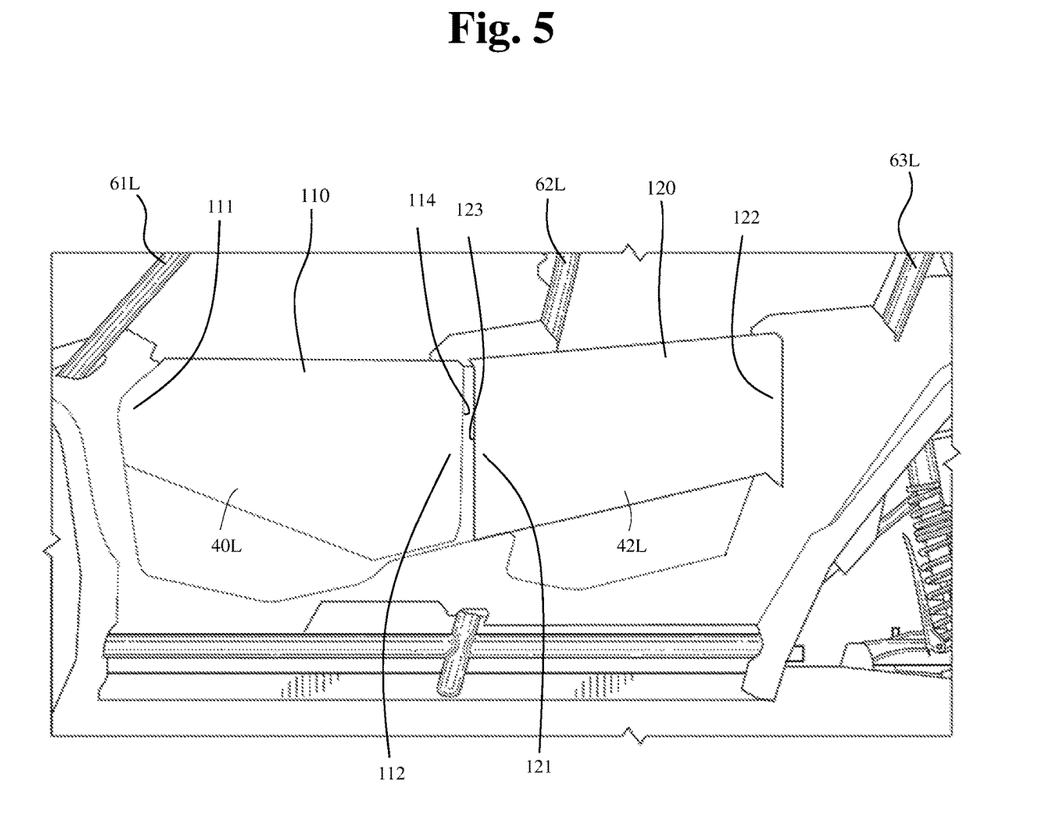
FIG. 5 is an enlarged view of a portion of FIG. 1 showing positional relationship of a door assembly relative to the second cage side member in accordance with the disclosed subject matter.

FIG. 5 is partial side view showing, in particular, a positional relationship of a rear door assembly 120 and front door assembly 110 relative to second cage side member 62L, in accordance with the disclosed subject matter. FIG. 5 shows the side of the vehicle the same as or similar to the vehicle shown in FIG. 1. FIG. 5 shows, and the description below describes, door assembly structure on the left side of the vehicle. However, it is appreciated that similar structure or arrangement may be used on the right side of the vehicle.

As shown in FIG. 5, the vehicle 10 includes a rear door assembly 120. The rear door assembly 120, which may be characterized as simply a door, includes a rear portion 122. The rear door assembly 120 may be pivotally supported by a hinge assembly at or adjacent to the rear portion 122 so as to allow movement of the rear door assembly 120 between a closed position and an open position, as will be discussed in further detail below.

The rear door assembly 120 also includes a front portion 121 that terminates at a front edge 123. The front edge 123 may include one or more edge segments. As shown, a substantial portion or all of the front edge 123 is positioned in front of the second cage side member 62L. That is, in some embodiments, the entire extent of the front edge 123 may be positioned forward, in the longitudinal direction of the vehicle, of the second cage side member 62L, i.e. so as to "overlap" the second cage side member 62L. In other words, the entire front edge of the rear door assembly extends beyond the second side member so as to fully "overlap", in the longitudinal direction L, the second cage side member 62L when viewed in the transverse direction T of the vehicle 10.

In some embodiments of the disclosure, a small portion of the front edge 123 may overlap with a portion of the second cage side member 62L, at a lower portion of the second cage side member 62L when viewed in the transverse direction T of the vehicle 10. In particular, the angle at which the second cage side member 62L is provided relative to the angle at which the front edge 123 is provided may result in a small portion of the front edge 123 being disposed/positioned in back of a front edge of the second cage side member 62L, i.e. at a lower portion of the rear door assembly 120. In other words, a at least a portion of the front edge 123 of the rear door assembly 120 can be located at a position such that the rear door assembly 120 extends beyond the second cage side member 62L so as to fully "overlap" the second cage side member 62L along the longitudinal direction L of the vehicle 10 when viewed in the transverse direction of the vehicle 10.

As shown in FIG. 5, the vehicle 10 includes a front door assembly 110. The front door assembly 110, which may be characterized as simply a door, includes a front portion 111 and a rear portion 112. The front door assembly 110 may be pivotally supported by a hinge assembly at or adjacent to the rear portion 112 so as to allow movement of the front door assembly 110 between a closed position and an open position, as will be discussed in further detail below.

The front door assembly 110 also includes a rear edge 114. The rear edge 114 may include one or more edge segments. As shown, in accordance with the disclosed subject matter, all of the rear edge 114 is positioned in front of the second cage side member 62L. That is, the entire extent of the rear edge 114, including edge segments of the rear edge (of the front door assembly 110) can be positioned forward, in the longitudinal direction of the vehicle, of the second cage side member 62L.

The arrangement of FIG. 2 includes front door assembly 110 and rear door assembly 120. The rear door assembly 120 includes a front edge 123 that includes multiple front edge segments. Specifically, the front edge 123, of the rear door assembly 120, includes first front edge segment 124 and second front edge segment 125. The second front edge segment 125 may extend along a substantial portion of the front edge 123. The first front edge segment 124 can define a small portion (of the front edge 123), provided at the top, of the front edge 123. The second front edge segment 125 can be aligned with or substantially aligned with the vertical direction V in at least some embodiments of the disclosure. As shown, the entire extent of the front edge 123, including the first front edge segment 124 and the second front edge segment 125 is located forward, along the longitudinal direction L, of the second cage side member 62L. In other words, the front edge 123, including all the segments of the front edge 123 "overlap" the second cage side member 62L.

The front door assembly 110 includes a rear edge 114 that includes multiple rear edge segments. Specifically, the rear edge 114, of the front door assembly 110, includes first rear edge segment 115, second rear edge segment 116, and third rear edge segment 117. The second rear edge segment 116 may extend along a substantial portion of the rear edge 114. The first rear edge segment 115 can define a small portion (of the rear edge 114), provided at the top, of the rear edge 114. The third rear edge segment 117 can define a small portion (of the rear edge 114), provided at the bottom, of the rear edge 114.

The second rear edge segment 116 can be aligned with or substantially aligned with the vertical direction V in at least some embodiments of the disclosure. As shown, the entire extent of the rear edge 114, including the first rear edge segment 115, second rear edge segment 116, and the third rear edge segment 117, is located forward, along the longitudinal direction L, of the second cage side member 62L.

As shown in FIG. 2, a slotted spacing or slot 130 may extend along a portion of the front edge of the rear door assembly 120. The slot 130 may be defined by (a) the front edge 123, including any or all of the edge segments thereof, and (b) the rear edge 114, including any or all of the edge segments thereof. The front edge 123 may be parallel or substantially parallel to the rear edge 114. Relatedly, any or all of the segments of the front edge 123 may be substantially parallel or parallel to a corresponding segment of the rear edge 114, of the front door assembly 110.

The width of the slot 130, i.e. in the longitudinal direction of the vehicle 10, can be any appropriate value that is sufficient to allow clearance of the door assemblies 110, 120 relative to each other, so as to allow opening and closing of the door assemblies 110, 120. The slot 130, as defined by the edges 114, 123 (and segments thereof), can be vertical or substantially vertical along the vertical direction V. The slot 130, as defined by the edges 114, 123, or segments of the slot 130, can be disposed at an angle.

FIG. 2 also shows a front door hinge assembly 128 on the left-front door 110 assembly in accordance with the disclosed subject matter. The front door hinge assembly 128 can provide or allow pivoting motion of the front door assembly 110 between a closed position and an open position, as well as to interim positions, as may be desired. The front door hinge assembly 128 includes a connector 118, a lower hinge 119, and an upper hinge 129. The upper hinge 129 can be attached to the frame assembly 18, for example, on the second cage side member 62L by a bracket 140. Alternate attachment mechanisms for the hinges 119, 129 or devices that may be used can include bolts, screws, or additional brackets, for example. The connector 118 can be attached to the front door or front door assembly 110. Attachment mechanisms or devices that may be used, to provide such attachment to the front door assembly 110, can include bolts, screws, or additional brackets, for example. The connector 118 may openings that receive each of the lower hinge 119 and the upper hinge 129. A lower end of the lower hinge 129 may be rotatably supported on the third cage side member 63L directly or by an intermediate member as shown in FIG. 2. The connector 118 can pivot on a lower end of the upper hinge 129. The lower end of the upper hinge 129 and the lower end of the lower hinge are located on a hinge axis about which the rear door assembly 120 can pivot between the opened and closed positions.

The right-side door assemblies 131, 132 can include hinge assemblies as described above with respect to the left-side door assemblies 110, 120.

FIG. 2 also shows a rear door hinge assembly 142 on the left-rear door assembly 120 in accordance with the disclosed subject matter. The rear door hinge assembly 142 can provide or allow pivoting motion of the rear door assembly 120 between a closed position and an open position, as well as to interim positions, as may be desired. The rear door hinge assembly 142 includes a connector 144, a lower hinge 146, and upper hinge 148. The upper hinge 148 can be attached to the frame assembly 18, for example, on the third cage side member 63L by a bracket 150. Alternate attachment mechanisms for the hinges 146, 148 or devices that may be used can include bolts, screws, or additional brackets, for example. The connector 144 can be attached to the rear door assembly 120. Attachment mechanisms or devices that may be used, to provide such attachment to the rear door assembly 120, can include bolts, screws, or additional brackets, for example. The connector 144 may include openings that receive each of the lower hinge 146 and the upper hinge 148. A lower end of the lower hinge 144 may be rotatably supported on the third cage side member 63L directly or by an intermediate member as shown in FIG. 2. The connector 144 can pivot on a lower end of the upper hinge 148. The lower end of the upper hinge 148 and the lower end of the lower hinge 146 are located on a hinge axis about which the rear door assembly 120 can pivot between the opened and closed positions.

Figure 6:
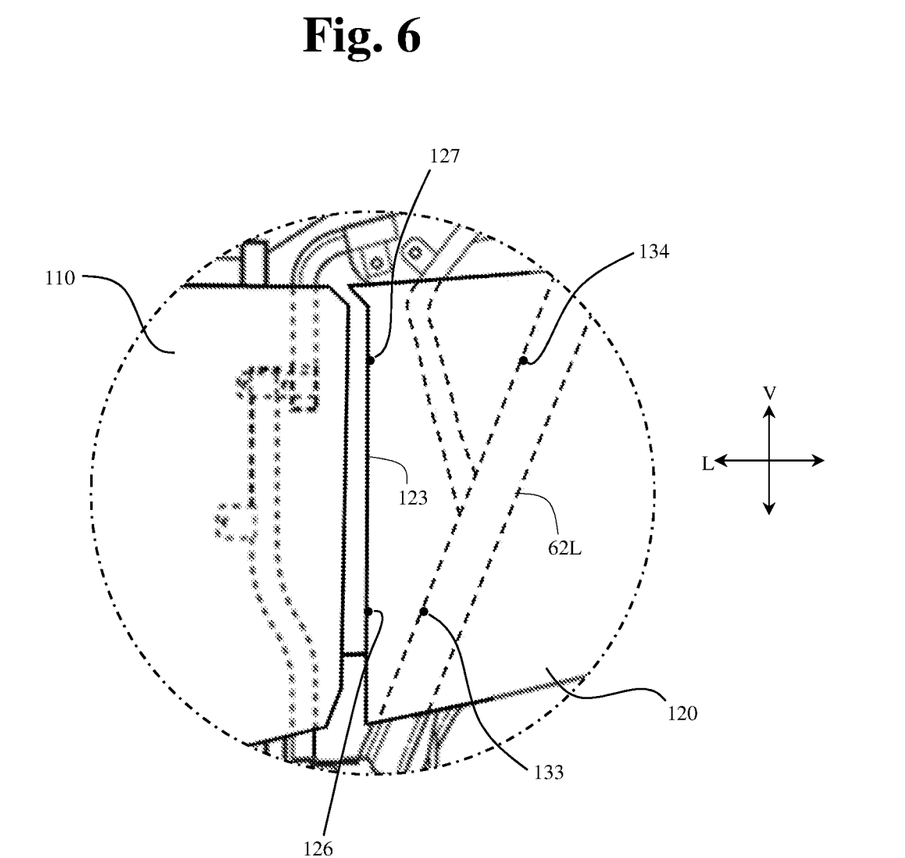
FIG. 6 is an enlarged view of a portion of FIG. 2, showing further aspects of a door assembly in accordance with the disclosed subject matter.

FIG. 6 is a partial view of the arrangement of FIG. 2, showing further aspects of door assembly or door structure, in accordance with the disclosed subject matter. FIG. 6 is provided to further illustrate and provide disclosure of the manner in which the complete front edge 123, including segments of such front edge 123, may be provided or disposed fully forward, in the longitudinal direction L of the vehicle, of the second cage side member 62L.

As illustrated by FIG. 6, the second cage side member 62L can be constructed, as otherwise described herein, as a hollow metal tube, for example. Such structure can be characterized as including a forward edge, in the longitudinal L direction. Such edge may be constituted by a smooth contour. Such smooth contour may be rounded, for example, or some other shape. The front edge, of the second cage side member 62L, may be characterized as formed of a plurality of points, i.e. may be characterized as formed of a potentially infinite number of points. For purposes of description, any point on such front edge, of the second cage side member 62L may be characterized as constituting a second side member front edge point, which possesses a vertical position.

The front edge 123, of the rear door assembly 120, may be characterized as formed of a plurality of points, i.e. may be characterized as formed of a potentially infinite number of points. For purposes of description, any point on such front edge (of the rear door assembly 120) may be characterized as constituting a rear door front edge point. Each such rear door front edge point possesses a vertical position relative to the longitudinal member 38L in the vertical direction V of the vehicle 10.

In accordance with the disclosed subject matter, an arrangement can be provided such that each rear door front edge point (a) possesses a vertical position in the vertical direction V, (b) is associated with a corresponding second side member front edge point based on having the same vertical position relative to the longitudinal member 38L in the vertical direction V of the vehicle 10 as such corresponding second side member front edge point, and (c) is positioned forward, in the longitudinal direction L, of such corresponding second side member front edge point. In other words, each point on the front edge 123 corresponds to a point on the front edge of the second cage side member 62L by virtue of such two "corresponding" points being at the same vertical position or height. Furthermore, for such two corresponding points, the rear door front edge point is positioned or disposed forward, along the longitudinal direction, of the second side member front edge point.

In illustration, a first point 126 of the front edge of the rear door is at the same vertical height from the longitudinal member 38L in the vertical direction V of the vehicle as a second point 133 of the front edge of the second side member, and thus such two points are "corresponding" points. Such two corresponding points have the relationship that the first point 126 is forward (in the longitudinal direction L) of the second point 133.

In further illustration, a third point 127 of the front edge of the rear door is at the same vertical height from the longitudinal member 38L in the vertical direction V of the vehicle as a fourth point 134 of the front edge of the second side member, and thus such two points are "corresponding" points. Such two corresponding points have the relationship that the third point 127 is forward (in the longitudinal direction L) of the fourth point 134.

It is appreciated that the various components of embodiments of the disclosure can be made from any of a variety of materials including, for example, metal, plastic, plastic resin, nylon, composite material, leather, and/or rubber, for example, or any other material as may be desired.

A variety of production techniques can be used to make the apparatuses as described herein. For example, suitable casting and/or injection molding and other molding techniques, extrusion and other manufacturing techniques might be utilized.

While the subject matter has been described in detail with reference to exemplary embodiments thereof, it will be apparent to one skilled in the art that various changes can be made, and equivalents employed, without departing from the scope of the invention.

For example, embodiments are disclosed above in which the door assemblies include an upper hinge and a lower hinge connected by a connector. However, embodiments are intended to include or otherwise cover an upper hinge directly connected to the door panel assembly and a lower hinge directly connected to the door panel assembly. Further one of the upper and lower hinges can be omitted.

Exemplary embodiments are intended to include or otherwise cover door assemblies that include a hinge assembly that has a hinge axis that extends along the longitudinal direction L of the vehicle such that the door assembly can pivot along the vertical direction V of the vehicle.

Exemplary embodiments are intended to include or otherwise cover door assemblies that are slidably mounted on the vehicle frame assembly such that the front and rear door assemblies slide away from each other in the longitudinal direction L of the vehicle when moving to the opened position and slide toward each other in the longitudinal direction L of the vehicle when moving to the closed position.

What is claimed is:

1. A door assembly for selectively opening and closing first and second openings in a vehicle frame assembly, the first opening extending between a first side frame member and a second side frame member, and the second opening extending between the second side frame member and a third side frame member, the door assembly including:
    a front door assembly that extends along the first opening and between the first and second side frame members, the front door assembly is movably connected to the vehicle frame between an opened position and a closed position to selectively open and close the first opening, the front door assembly includes a front portion and a rear portion, the rear portion terminates in a longitudinal direction of the frame assembly at a rear edge, and at least a portion of the rear edge is spaced away from the second side frame member in the longitudinal direction toward the first side frame member; and
    a rear door assembly that extends along the second opening and between the second side and third side frame members, the rear door assembly is movably connected to the vehicle frame between an opened position and a closed position to selectively open and close the second opening, the rear door assembly includes a front portion and a rear portion, the front portion terminates in a longitudinal direction of the frame assembly at a front edge, the front edge is adjacent to the rear edge of the front door, and at least a portion of the front edge is spaced away from the second side frame member in the longitudinal direction toward the first side frame member such that at least a portion of the front edge of the rear door assembly is located between the rear edge of the front door assembly and the second side frame member.

2. The door assembly of claim 1, further including a rear hinge assembly connected to the third side frame member and connected to the rear portion of the rear door assembly such that the rear door assembly pivots about the rear hinge assembly between the opened position and the closed position.

3. The door assembly of claim 2, wherein the rear hinge assembly includes,
    an upper hinge that is spaced away from the third side frame member in the longitudinal direction and is located between the second and third side frame members, and
    a lower hinge that is spaced away from the third side frame member in the longitudinal direction and is located between the second and third side frame members.

4. The door assembly of claim 2, further including a front hinge assembly connected to the second side frame member and connected to the rear portion of the front door assembly such that the front door assembly pivots about the front hinge assembly between the opened position and the closed position.

5. The door assembly of claim 4, wherein the front hinge assembly includes,
    an upper hinge that is spaced away from the second side frame member in the longitudinal direction and is located between the first and second side frame members, and
    a lower hinge that is spaced away from the second side frame member in the longitudinal direction and is located between the first and second side frame members.

6. The door assembly of claim 1, wherein the at least a portion of the front edge of the rear door assembly is located between the upper hinge and the second side frame member.

7. The door assembly of claim 1, wherein the rear edge of the front door assembly is aligned with and spaced from the front edge of the rear door assembly to define a slotted spacing between the rear edge of the front door assembly and the front edge of the rear door assembly, and the slotted space overlaps only a portion of second side frame member in the longitudinal direction.

8. The door assembly of claim 7, wherein the slotted spacing extends substantially parallel to a vertical direction of the vehicle frame assembly, and the second side frame member extends an acute angle with respect to the slotted space.

9. The door assembly of claim 1, wherein the rear door assembly includes,
    a rear door panel assembly, the door panel assembly includes the front portion, the rear portion and the front edge of the rear door assembly, and further includes an upper edge and a rear edge, the rear portion of the rear door assembly terminates in the longitudinal direction at the read edge, and the upper edge extends from the front edge to the rear edge in the longitudinal direction, and
    a door net assembly including a web and a frame surrounding the web, the frame is connected the upper edge of the door panel assembly and to the vehicle frame assembly.

10. An all-terrain vehicle comprising:
    a frame assembly including:
        first and second longitudinal frame members extending in a longitudinal direction of the vehicle and spaced apart in a transverse direction of the vehicle;
        a first side frame member extending from the first longitudinal member in a vertical direction of the vehicle;
        a second side frame member extending from the first longitudinal member in the vertical direction of the vehicle; and
        a third side frame member extending from the first longitudinal member in the vertical direction of the vehicle, and the second side frame member is located between the first side frame member and the third side frame member in the longitudinal direction of the vehicle;
    a plurality of wheels attached to the vehicle frame;
    a front door assembly that extends along the first opening and between the first and second side frame members, the front door assembly is movably connected to the vehicle frame between an opened position and a closed position to selectively open and close the first opening, the front door assembly includes a front portion and a rear portion, the rear portion terminates in a longitudinal direction of the frame assembly at a rear edge, and at least a portion of the rear edge is spaced away from the second side frame member in the longitudinal direction toward the first side frame member; and a rear door assembly that extends along the second opening and between the second side and third side frame members, the rear door assembly is movably connected to the vehicle frame between an opened position and a closed position to selectively open and close the second opening, the rear door assembly includes a front portion and a rear portion, the front portion terminates in a longitudinal direction of the frame assembly at a front edge, the front edge is adjacent to the rear edge of the front door, and at least a portion of the front edge is spaced away from the second side frame member in the longitudinal direction toward the first side frame member such that at least a portion of the front edge of the rear door assembly is located between the rear edge of the front door assembly and the second side frame member.

11. The door assembly of claim 10, further including a rear hinge assembly connected to the third side frame member and connected to the rear portion of the rear door assembly such that the rear door assembly pivots about the rear hinge assembly between the opened position and the closed position.

12. The door assembly of claim 11, wherein the rear hinge assembly includes, an upper hinge that is spaced away from the third side frame member in the longitudinal direction and is located between the second and third side frame members, and a lower hinge that is spaced away from the third side frame member in the longitudinal direction and is located between the second and third side frame members.

13. The door assembly of claim 12, further including a front hinge assembly connected to the second side frame member and connected to the rear portion of the front door assembly such that the front door assembly pivots about the front hinge assembly between the opened position and the closed position.

14. The door assembly of claim 13, wherein the front hinge assembly includes, an upper hinge that is spaced away from the second side frame member in the longitudinal direction and is located between the first and second side frame members, and a lower hinge that is spaced away from the second side frame member in the longitudinal direction and is located between the first and second side frame members.

15. The door assembly of claim 1, wherein the at least a portion of the front edge of the rear door assembly is located between the upper hinge and the second side frame member.

16. The door assembly of claim 1, wherein the rear edge of the front door assembly is aligned with and spaced from the front edge of the rear door assembly to define a slotted spacing between the rear edge of the front door assembly and the front edge of the rear door assembly, and the slotted space overlaps only a portion of second side frame member in the longitudinal direction.

17. The door assembly of claim 16, wherein the slotted spacing extends substantially parallel to a vertical direction of the vehicle frame assembly, and the second side frame member extends an acute angle with respect to the slotted space.

18. A structural system for a vehicle, the structural system including:

a frame assembly that includes:

a first side member provided on a side of the vehicle, the first side member extending vertically on the side of the vehicle;

a second side member provided on the side of the vehicle, the second side member extending vertically on the side of the vehicle, and the second side member disposed behind the first side member and in front of a third side member, and any point on a front contour of the second side member constituting a second side member front edge point; and the third side member provided on the side of the vehicle, the third side member extending vertically on the side of the vehicle, and the third side member disposed behind the first side member; and a rear door assembly that is provided on the side of the vehicle, the rear door assembly having a front edge and a rear portion, and the rear door assembly being movably attached to the vehicle frame so as to be movable between a first position to a second position, and any point on the front edge of the rear door assembly constituting a rear door front edge point, and each rear door front edge point:

(a) possessing a vertical position in the vertical direction, (b) associated with a corresponding second side member front edge point based on having the same vertical position as such corresponding second side member front edge point, and (c) positioned forward, in the longitudinal direction, of such corresponding second side member front edge point.

19. The structural system of claim 17, further including at least one hinge assembly provided at the rear portion of the rear door assembly, the at least one hinge assembly providing the rear door assembly to be adjustable from the first position to the second position.

20. The structural system of claim 18, further including:

a front door assembly that is provided on the side of the vehicle, the front door assembly having a rear portion that includes a rear edge, and the front door assembly being adjustably attached to the vehicle frame, by a hinge, so as to be adjustable from a closed disposition to an open disposition, and the rear edge being adjacent to the front edge of the rear door.

* * * * *